United States Patent
Eckman et al.

(10) Patent No.: US 6,488,193 B1
(45) Date of Patent: Dec. 3, 2002

(54) GUIDE CONVEYOR HAVING A LATERALLY ADJUSTABLE DEFLECTOR ROLLER AT THE END

(75) Inventors: Raymond Patrick Eckman, Stow, OH (US); Gary Robert Burg, Canton, OH (US); Mark Daniel Banas, Cuyahoga Falls, OH (US)

(73) Assignee: The Goodyear Tire & Rubber Co., Akron, OH (US)

( * ) Notice: Subject to any disclaimer, the term of this patent is extended or adjusted under 35 U.S.C. 154(b) by 0 days.

(21) Appl. No.: 09/554,251

(22) PCT Filed: Feb. 18, 1998

(86) PCT No.: PCT/US98/03324

§ 371 (c)(1),
(2), (4) Date: May 11, 2000

(87) PCT Pub. No.: WO99/42390

PCT Pub. Date: Aug. 26, 1999

(51) Int. Cl.$^7$ ........................ B65H 26/00; B65H 20/00; B65G 47/26
(52) U.S. Cl. .................... 226/20; 198/456; 198/631.1; 226/108; 226/170; 226/174; 226/188
(58) Field of Search ........................... 226/19, 20, 108, 226/170, 174; 198/456, 587, 631.1

(56) References Cited

U.S. PATENT DOCUMENTS

| | | | |
|---|---|---|---|
| 1,785,402 A | | 12/1930 | Arentzen |
| 1,974,826 A | * | 9/1934 | Low ............................ 226/19 |
| 2,569,004 A | | 9/1951 | Joy |
| 2,766,871 A | | 10/1956 | Arentzen |
| 2,959,269 A | * | 11/1960 | Kammerer .................. 198/587 |
| 3,244,418 A | | 4/1966 | Henderson |
| 3,289,867 A | | 12/1966 | Burke |
| 3,844,403 A | | 10/1974 | Stauber |
| 3,915,282 A | | 10/1975 | Remensperger |
| 4,043,442 A | * | 8/1977 | Greenwell et al. .......... 198/587 |
| 4,231,464 A | | 11/1980 | Neilson |
| 4,244,461 A | | 1/1981 | Fischer et al. |
| 5,167,751 A | * | 12/1992 | Shimizu et al. ................ 226/19 |

FOREIGN PATENT DOCUMENTS

| | | |
|---|---|---|
| EP | 0 508 304 A1 | 10/1992 |
| WO | WO 98/04488 | 2/1998 |

* cited by examiner

*Primary Examiner*—Michael R. Mansen
(74) *Attorney, Agent, or Firm*—Frederick K. Lacher; Bruce J. Hendricks; The Goodyear Tire & Rubber Co.

(57) ABSTRACT

A method and apparatus for conveying and applying a strip component (11) such as a tire tread is disclosed. The method includes the steps of placing the strip component on a belt conveyer (16), determining a guideline (52) of the strip component (11) at an exit end (20) of the belt conveyor (16), and laterally adjusting the exist end (20) of the belt conveyor (16) to align the guideline (52) of the strip component (11) with a predetermined guideline such as the guideline of a tire building drum (12). The apparatus includes a belt support transverse housing (76) which is laterally moveable by a motion controller (64) in response to a sensor (58) which detects the guideline (52) of the strip component (11). Guides on the transverse housing (76) move the belts of the conveyor (16) on slider plates without physically touching the conveyed strip component (11), thereby preventing damage to the component material. The invention described above may be utilized in a single conveyor, or in multiple conveyor apparatus where the conveyors may be keyed together for synchronized transmission of the components.

5 Claims, 7 Drawing Sheets

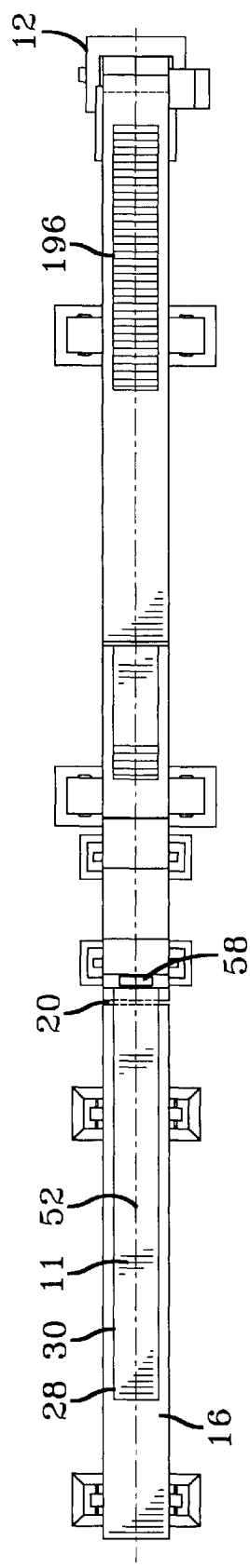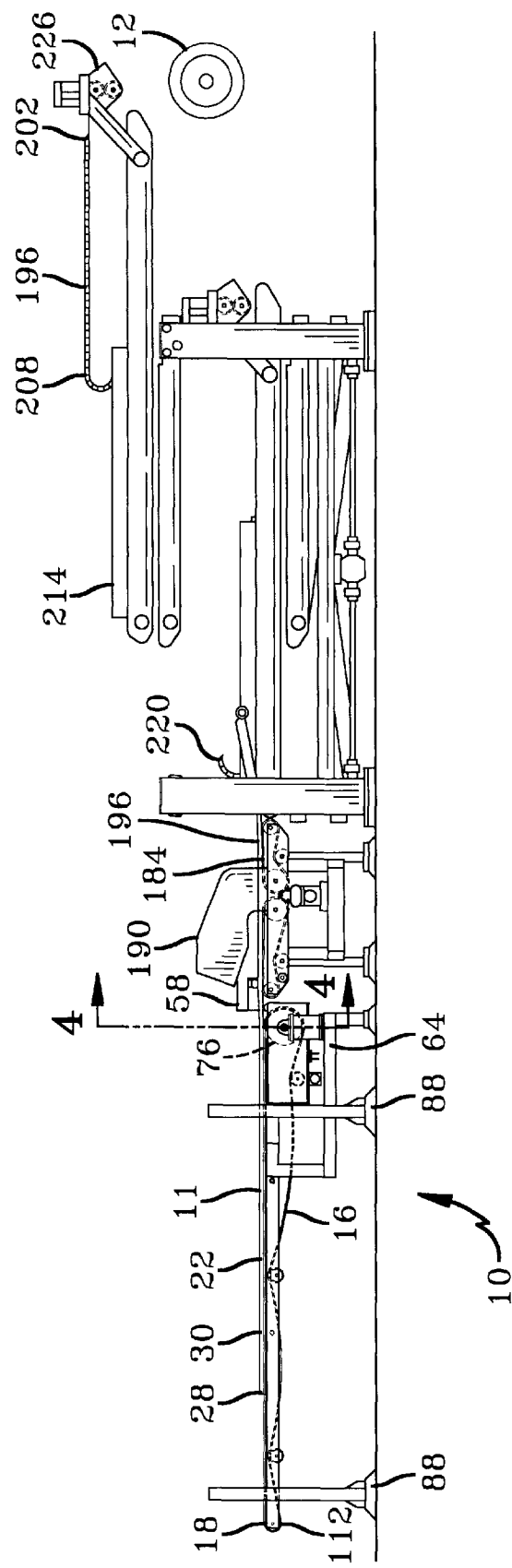

GUIDE CONVEYOR HAVING A LATERALLY ADJUSTABLE DEFLECTOR ROLLER AT THE END

TECHNICAL FIELD

This invention pertains to the art of methods and apparatuses for conveying materials, such as strip components on a belt conveyor, and more specifically to methods and apparatuses for conveying tire building components from a feeding extruder or other production location to a tire building drum on a belt conveyor which is capable of laterally adjusting the position of the components without using guides.

BACKGROUND ART

In the past, guides on conveyor belts such as pivoting steering rollers required strip component wrap-around to create traction for centering the component product which was often detrimental to the component. Also, self-feeding of many components through any type of rollers was unreliable.

International Application WO 98/04488 is directed to steering and guiding a strip component after conveying the strip component to an exit end with a plurality of guide disks canted at an angle to the shaft axis and by transverse movement of the disks.

Other methods included shifting the entire conveyor laterally to center the product. However, this required more elaborate machinery and a large entry loop in the case of strip or web products. Large loops may cause product stretch and make self-feeding difficult.

Another guiding method utilized curved modular belt conveyors however, the curves were static and did not act as active guides. Further, the belting typically used was more than twice the pitch length of that utilized by the present invention. Long pitch lengths introduce excessive speed undulation to the product due to chordal action at the sprockets.

The present invention contemplates a new and improved flexible guide belt conveyors which is simple in design, effective in use, and overcomes the foregoing difficulties and others while providing better and more advantageous overall results.

DISCLOSURE OF INVENTION

In accordance with the present invention, a new and improved flexible guide belt conveyor is provided which allows for active guiding of a fragile strip component on a feeder conveyor without using guides in contact with the material of the strip component.

More particularly, in accordance with one aspect of this invention, there is provided a method of conveying an elongated strip component and centering the strip component comprising the step of conveying the component on a first belt of a first belt conveyor having an entrance end and an exit end, method being characterized by the steps of:

(a) determining a location of a guideline of the elongated strip component at the exit end of the at first belt conveyor using a sensor;

(b) transmitting the location of the guideline to a motion controller; and, (c) activating a linear actuator to laterally move a belt supporting transverse housing located at the exit end to adjust the exit end of the first belt to align the elongated strip component with a predetermined guideline at the exit end and guiding the first belt by edge guides mounted on the transverse housing while supporting the first belt on a slide plate mounted on the transverse housing.

According to another aspect of the invention, there is provided a method of applying tire components to a tire building drum including the step of transferring the tire components on at least one belt conveyor having an entrance end and an exit end, the method characterized by the steps of determining a location of the guideline of the tread member at the exit end of the at least one belt conveyor by means of a sensor, activating a linear actuator to laterally move the transverse housing located at the exit end to adjust the exit end of at least one belt conveyor to align the tread member with a guideline of a tire building drum.

In accordance with another aspect of the invention there is provided a belt conveyor having an entrance end and an exit end, with apparatus for adjusting the exit end of a belt conveyor including a laterally adjustable belt characterized by:

(a) the belt conveyor having a fixed support at the entrance end, a laterally movable belt supporting transverse housing at the exit end, drive means mounted on the transverse housing, at least two edge guides mounted on the transverse housing for guiding the belt transversely at the exit end, and a slide plate mounted on the housing to support and permit lateral movement of the belt at the exit end.

In accordance with a further aspect of the invention, there is provided an apparatus for adjusting exit ends of a plurality of belt conveyors, each of the belt conveyors comprising a plurality of spaced apart modules supported by hinge pins thereby providing lateral flexibility characterized by each of the belt conveyors having a fixed frame at an entry end and a laterally moveable transverse housing at one of the exit ends, and the fixed frame and the transverse housing having slide plates to support and permit lateral adjustment of the belt conveyors.

In accordance with a still aspect of the invention, there is provided a method of adjusting an exit end of a belt conveyor conveying a strip component characterized by the steps of sensing a position of a guideline of the strip component with sensing means, and activating a linear actuator to move a transverse housing of the conveyor, thereby moving a belt on the conveyor and the strip component until the guideline of the strip component is centered with respect to a predetermined position.

One advantage of the present invention is its ability to laterally adjust the position of a component transported on a conveyor belt without contacting the edges of the component.

Another advantages of the present invention is its ability to synchronize the movement of strip components on at least two conveyor belts.

Another advantage of the present invention is its ability to adjust the positions of the guidelines of multiple components on multiple conveyor belts.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein:

FIG. 1A is a schematic side elevation of a single belt conveyor assembly embodying the invention;

FIG. 1B is a schematic plan view of the belt conveyor shown in FIG. 1;

DETAILED DESCRIPTION OF THE INVENTION

Figure 2:
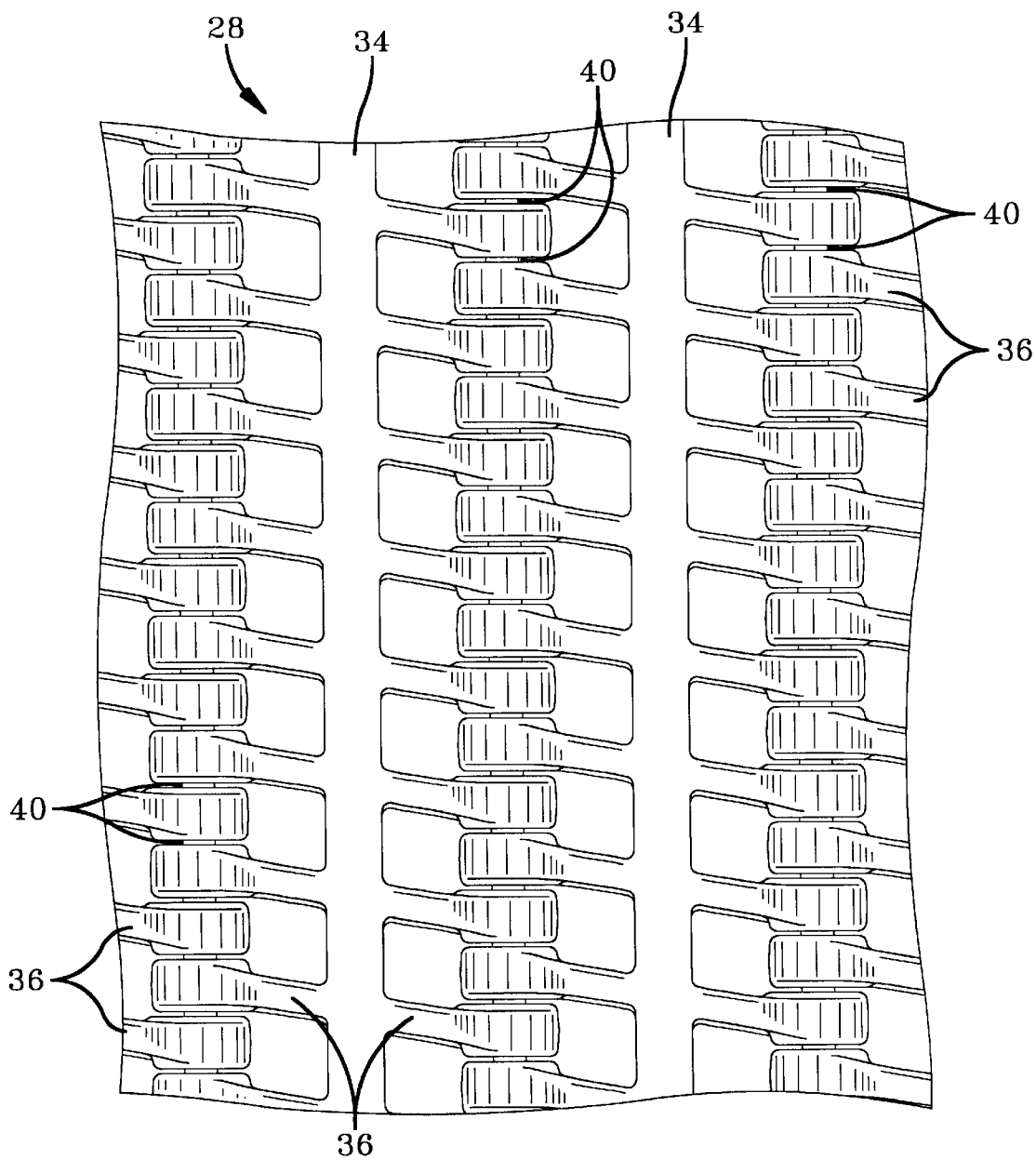
FIG. 2 is a enlarged fragmentary plan view of a laterally flexible conveyor belt adapted for use in the embodiment of FIGS. 1A and 1B.

Referring now to the drawings wherein the showings are for purposes of illustrating a preferred embodiment of the invention only and not for purposes of limiting the same, FIG. 1A shows a side elevation of a conveyor assembly 10 for conveying strip materials such as a tire tread 11 to a tire building drum 12. The conveyor assembly 10 preferably includes at least one feed belt conveyor 16 having an entrance end 18 and an exit end 20 that is capable of carrying the tire tread 11. The feed belt conveyor 16 preferably utilizes a laterally flexible conveyor belt having linked modules 34 with links 36 joined by hinge pins 40, as shown in FIG. 2. There is preferably a small amount of clearance between the links 36 of the modules 34, thereby permitting limited lateral shifting and flexibility of the conveyor belt 28. While the conveyor belt 28 described above is the preferred embodiment, any other of conveyor belt 28 with lateral flexibility may be utilized with the present invention.

Figure 3:
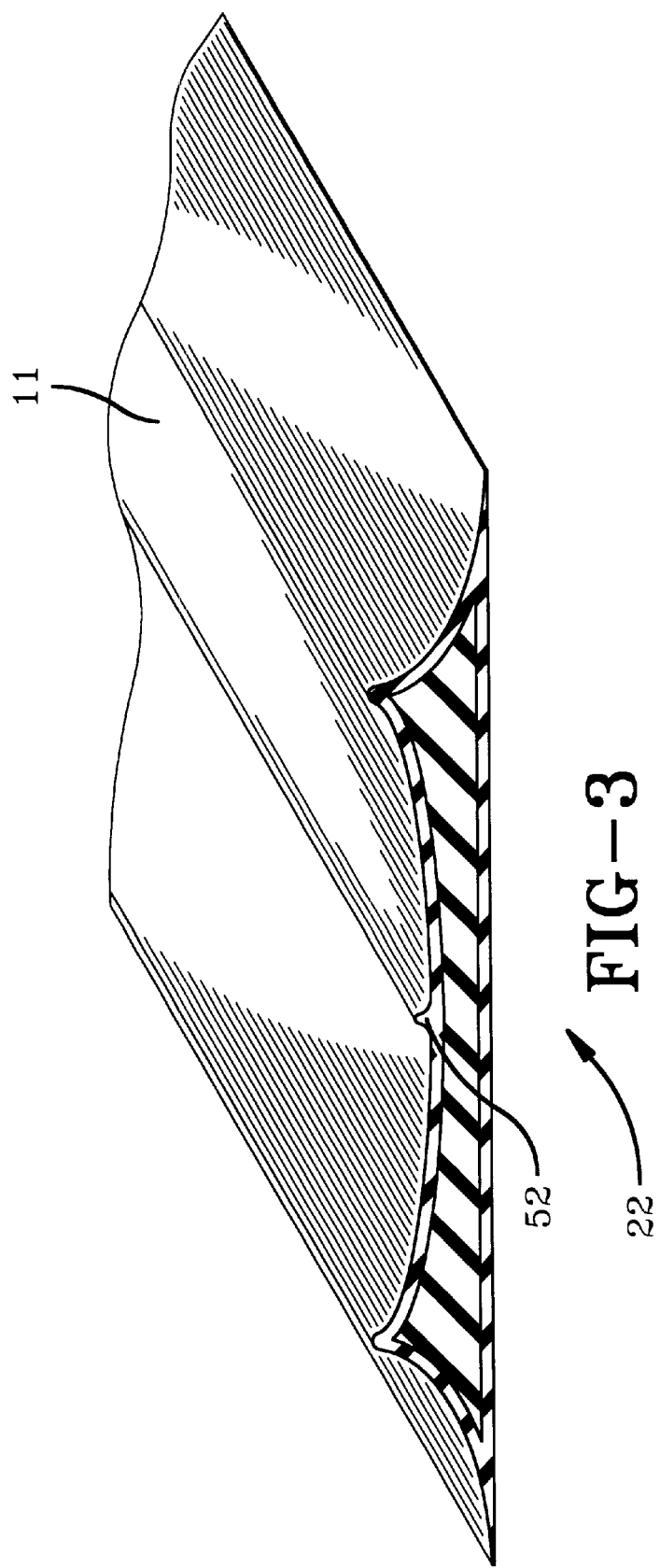
FIG. 3 is an enlarged cross section of a tire tread of FIGS. 1A and 1B showing the raised guideline rib.

With continuing reference to FIGS. 1A and 1B, the continuous tire tread 11 is conveyed by the feed conveyor 16 from a feeding position 30 to the exit end 20 and preferably has a guideline rib 52, as shown in FIG. 3. The guideline rib 52 as shown in FIG. 3 is along the centerline of tire tread 11. However, the guideline rib 52 may also be off center. The guideline rib 52 may be detected by a die-line sensor 58. The sensor 58 determines the relative location of the guideline rib 52 of the tire tread 11 and provides an analog signal that is transmitted to a motion controller assembly 64. The motion controller assembly 64 uses the analog signal for negative feedback to a position loop that controls the lateral location of the exit end 20 of the feed belt conveyor 16. Guiding occurs as a result of the feed belt conveyor 16 moving laterally in the direction of travel of the tire tread 11 in response to the negative feedback from the sensor 58. In the preferred embodiment, the sensor 58 consist of a retro-reflective infrared scanner and a DOS based PC-compatible compatible computer and monitor.

The motion controller 64 moves the exit end 20 of the feed belt conveyor 16 laterally at 90° to the direction of the feed conveyor 16. The exit end 20 of the feed belt conveyor 16 includes a lateral adjustable transverse housing 76. The entrance end 18 of the feed conveyor 16 is preferably fixed, and is supported by a fixed frame 88.

Figure 4:
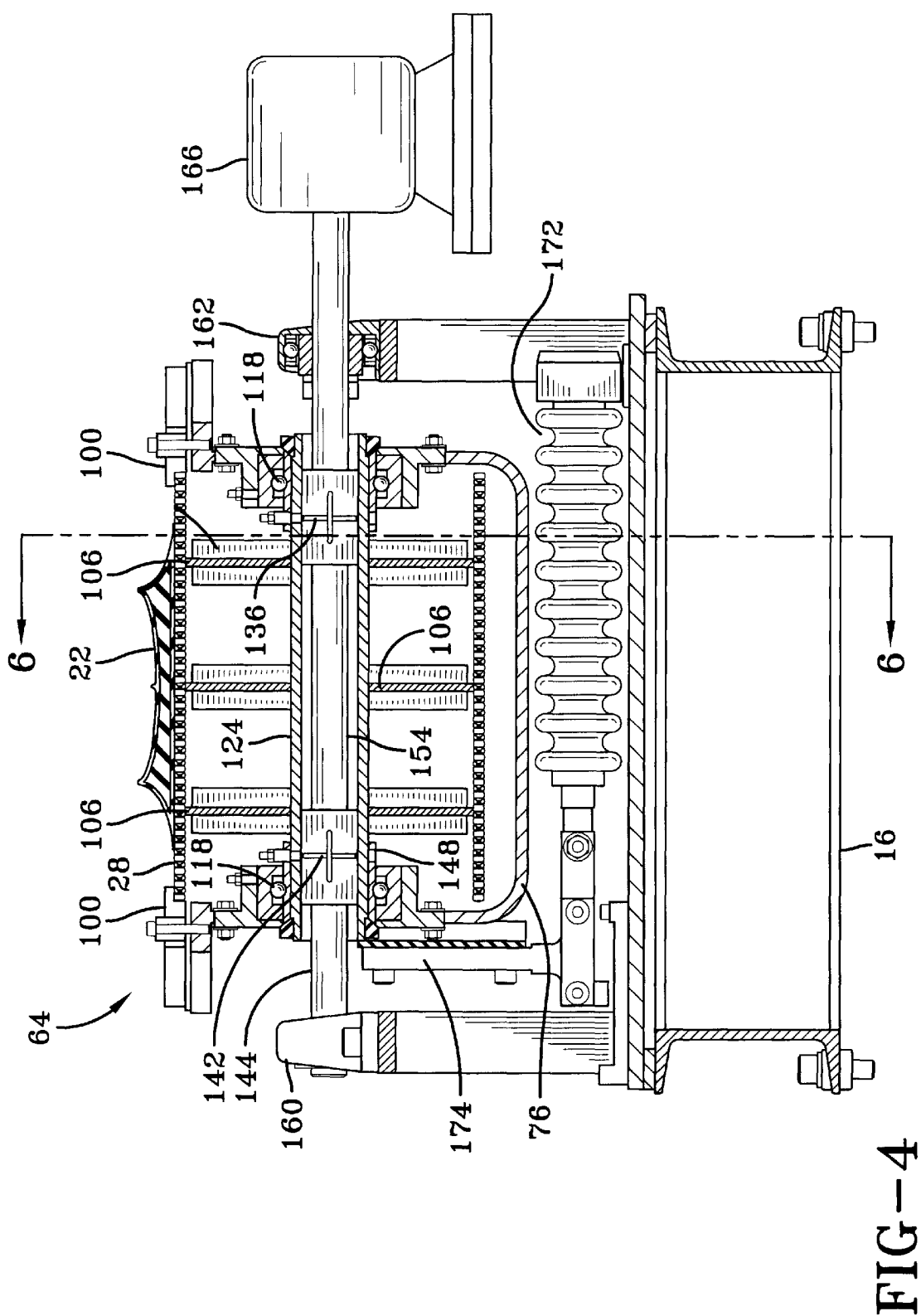
FIG. 4 is a detailed cross sectional view of the exit end of the belt conveyor assembly according to the present invention taken along the line 4—4 of FIG. 1A with parts being broken away.
Figure 6:
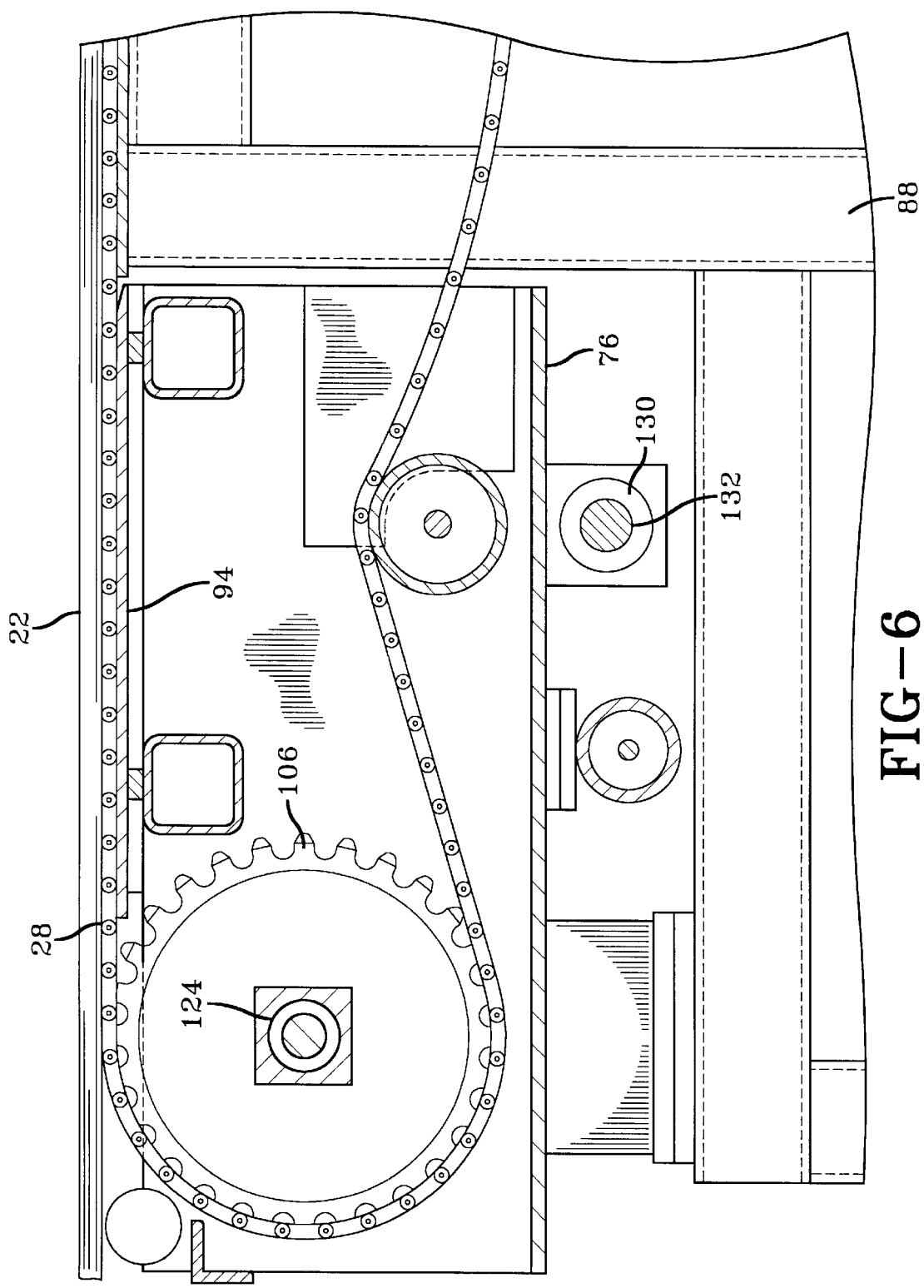
FIG. 6 is a sectional view through the traversing section taken along line 6—6 of FIG. 4; and, FIG. 7 is a schematic plan view of the two conveyor system shown in FIGS. 5 and 6.

The transverse housing 76, as viewed in FIG. 6, preferably has a slider plate 94 to support the conveyor belt 28. As shown in FIG. 4, guides 100, which may be made of plastic or any other suitable material, are preferably provided to ensure that the conveyor belt 28 is not skewed as it enters and leaves sprockets 106. Belt idler sprockets 112, and shafting (not shown) are mounted at the entrance end 18 of the feed conveyor 16, as shown in FIG. 1A.

With continuing reference to FIG. 4, the transverse housing 76 which encloses the belt drive sprockets 106 and bearings 118 that support most of the weight of the transverse housing is carried on a hollow shaft 124. The remaining weight of the transverse housing 76 is carried by a ball bushing 130 on a shaft 132 mounted on the frame 88, as shown in FIG. 6.

Two ball spline nuts 136, 142 mounted on a drive shaft 144 are retained inside the hollow shaft 124 of the transverse housing 76. One ball spline nut 136 is keyed on its outside diameter 148 to the inside diameter 154 of the hollow shaft 124 for torque transmission. The drive shaft 144 which is supported by pillow blocks 160 and 162, is coupled to a servo motor drive 166. Lateral transverse movement of the hollow shaft 124 and transverse housing 76 is provided preferably by a dedicated DC motor-powered linear actuator 172 connected to the housing by arm 174 when activated and controlled by the motion controller 64.

This assembly at the exit end 20 provides low fraction lateral motion of the transverse housing 76. At the beginning of a strip component run, the transverse housing 76 is automatically positioned in its center position by the motion controller 64 of the linear actuator 172. The strip material 22 is placed on the feed conveyor 16 at a location on the conveyor belt 28 which is not critical. The strip material 22 is easily self fed through the guide section. The position of the strip material 22 exiting the feed belt conveyor 16 is monitored by the sensor 58. If an off center position of the strip material 22 is detected, the motion controller 64 moves the transverse housing 76 laterally by activating the linear actuator 172. The plastic guides 100 which are fixed to the transverse housing 76 force the belt 28 to move with the transverse housing 76. The radially extending part of the guides 100 act as fulcrums when the belt 20 shifts sideways. The inherent lateral flexibility of the conveyor belt 28 permits this movement while the slider plate 94 supports the belt as described above. The strip material 22 is accordingly presented to downstream equipment on center and in line with the guideline of the conveyor assembly 10.

Figure 5:
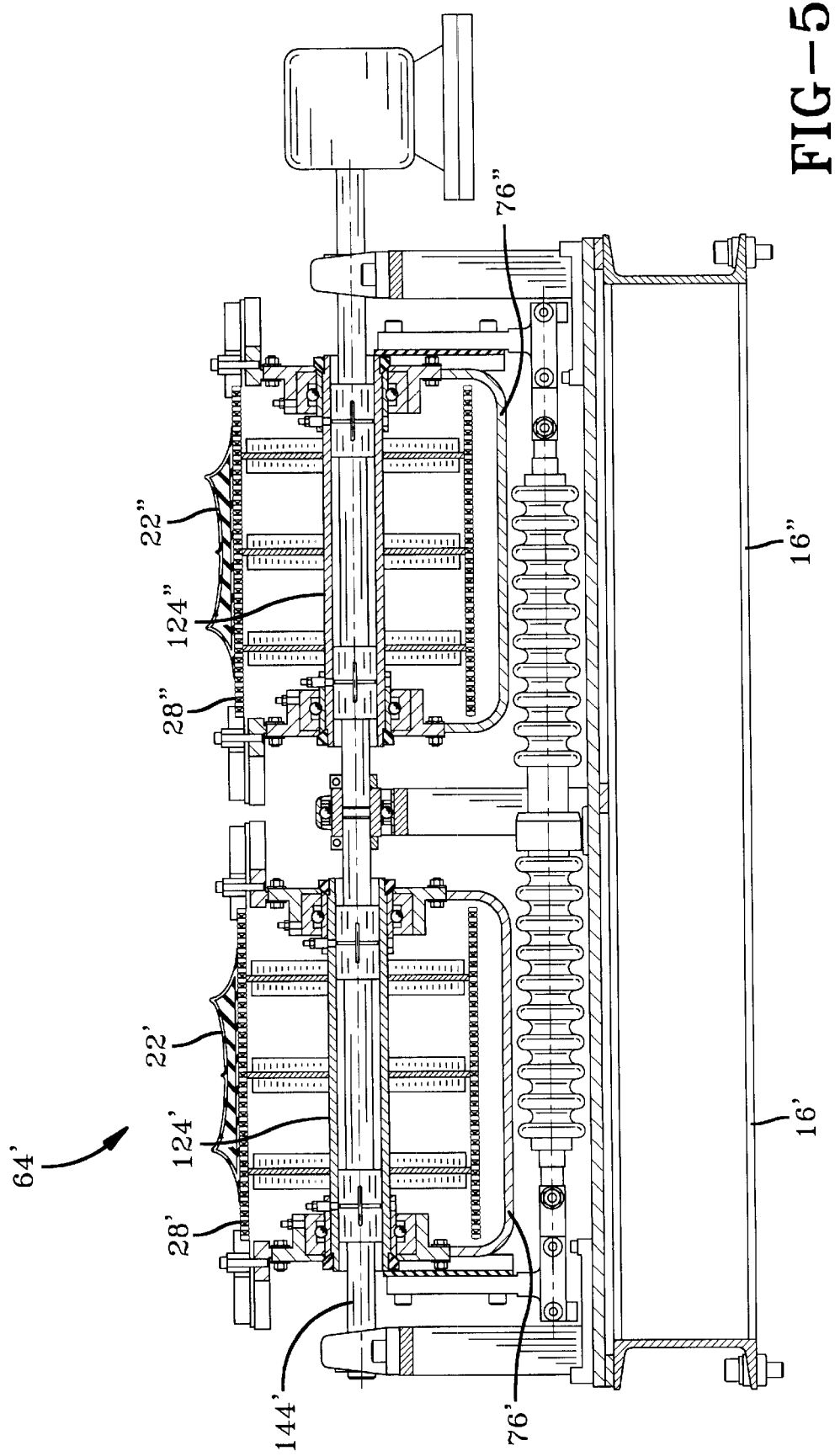
FIG. 5 is a view like FIG. 4 showing a two conveyor assembly.
Figure 7:
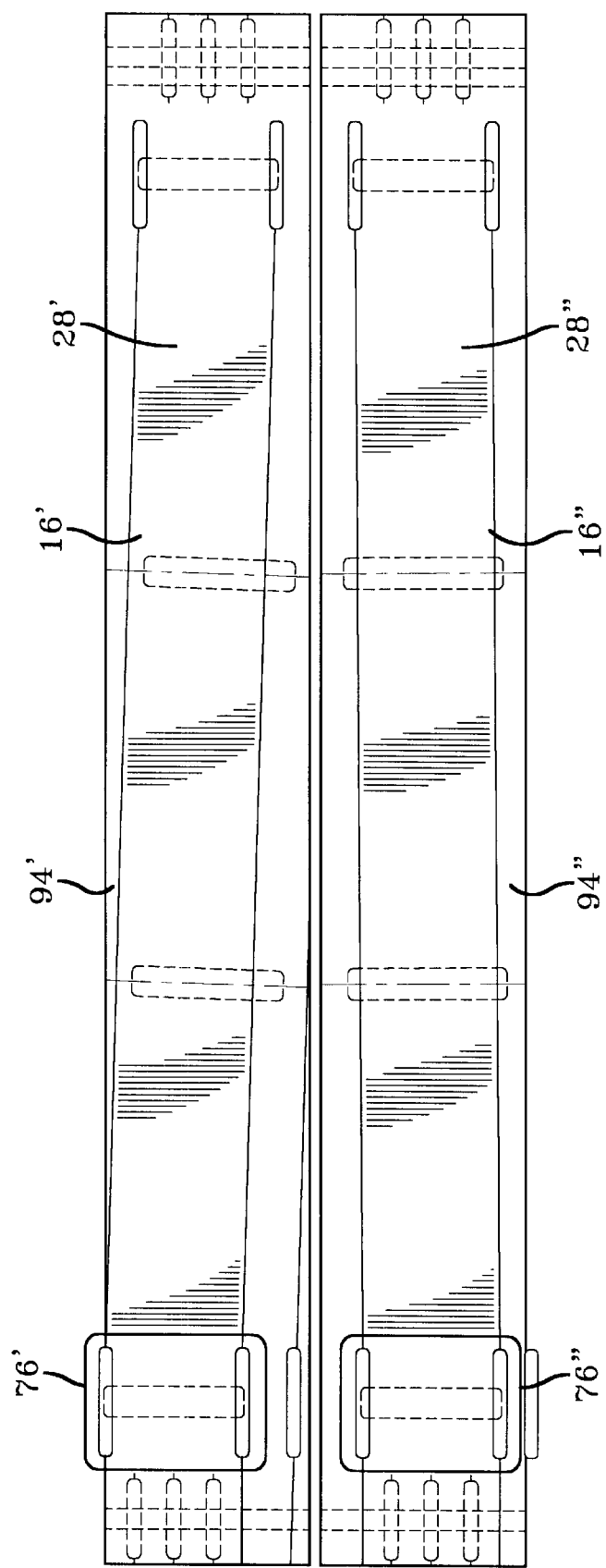

Heretofore, the present invention has been described with regards to a single belt feed conveyor 16. However, the invention may also be utilized for two or more belt feed conveyors 16', 16", as shown in FIG. 5. FIGS. 6 and 7 show additional views of the two conveyor assembly as shown in FIG. 5. In the case of two belt feed conveyors 16', 16", the hollow shafts 124', 124" are preferably keyed to the drive shaft 144 and coupled together. This allows for the two transverse housings 76', 76" to be driven by a single motor. Slider plates 94', 94" not shown are similar to slider plate 94 shown in FIG. 6 and support the laterally adjustable conveyor belts 28', 28".

The multiple transverse housing 76', 76" arrangement provides continued low friction independent lateral movement of the transverse housings as well as synchronized line speed of the conveyor belts 28', 28". If non-synchronized speeds of conveyor belts 28', 28" are desired, the splined hollow shafts 124',124" may be uncoupled and driven by separate drives.

Referring to FIG. 1A, after the strip material 22 such as tire tread 11 is conveyed by the feed conveyor 16 and is centered by the transverse housing 76, the tread 11 may be applied directly to a tire drum 12. In the preferred embodiment, as shown in FIGS. 1A and 2B, the tread 11 is centered by the transverse housing 76 and transferred to a cut conveyor 184 where it is cut by a cut conveyor knife 190. After being cut by the knife 190, the tread 196 has a leading end 202 and a tail end 208. The tread 196 which is still in the centered position is then transferred onto a tread applier 214 and conveyed to the tire building drum 12 where it is applied in the centered position to the drum.

The method described above it typically used when the strip material 22 is a tread 11 and consists of tread material. The tread 11 shown and described in the preferred embodiment of FIGS. 1A and 1B, only requires the single feed conveyor 16 as described above.

The preferred embodiments have been described, hereinabove. It will be apparent to these skilled in the art that the above apparatus and methods may incorporate changes and modifications without departing from the general scope of this invention. It is intended to include all such modifications and alterations in so far as they come within the scope of the appended claims or the equivalents thereof.

Having thus described the invention, it is now claimed:

1. A method of conveying an elongated strip component 11 and centering said strip component 11 comprising the step of conveying said component 11 on a first belt 28 of a first belt conveyor 16 having an entrance end 18 and an exit end 20, said method being characterized by the steps of;
   (a) determining a location of a guideline 52 of said elongated strip component 11 at said exit end 20 of said first belt conveyor 16 using a sensor 58;
   (b) transmitting said location of said guideline 52 to a motion controller 64; and,
   (c) activating a linear actuator 172 to laterally move a belt supporting transverse housing 76 located at said exit end 20 to adjust said exit end 20 of said first belt 28 to align said elongated strip component 11 with a predetermined guideline at said exit end 20 and guiding said first belt 28 by edge guides 100 mounted on said transverse housing 76 while supporting said first belt 28 on a slide plate 94 mounted on said transverse housing 76.

2. The method of claim 1 further comprising a second belt conveyor 16" for conveying a second elongated strip component 22" on a second belt 28" and centering said second strip component 22" about a second guideline further characterized by guiding said second belt 28" by second edge guides 100 mounted on a second transverse housing 76" while supporting said second belt 28" on a second slide plate 94 mounted on said second transverse housing 76" to permit lateral movement of said second belt 28" carrying said second strip component 22" at said exit end 20 and driving said first belt conveyor 16 and said second belt conveyor 16" at the same speed with a single drive means 166.

3. A belt conveyor having an entrance end 18 and an exit end 20, with apparatus for adjusting said exit end 20 of said belt conveyor 16 including a laterally adjustable belt 28 characterized by:
   (a) said belt conveyor 16 having a fixed support 88 at said entrance end 18, a laterally movable belt supporting transverse housing 76 at said exit end 20, drive means 166 mounted on said transverse housing 76, at least two edges guides 100 mounted on said transverse housing 76 for guiding said belt 28 transversely at said exit end 20, and a slide plate 94 mounted on said housing 76 to support and permit lateral movement of said belt 28 at said exit end 20.

4. The apparatus of claim 3 further characterized by:
   (a) said transverse housing 76 including a belt drive sprocket 106, bearings 118, and a grooved drive shaft 144, said belt drive sprocket 106 and said bearings 18 being carried on a hollow shaft 124, said hollow shaft 124 retaining a first ball spline nut 136 and a second ball spline nut 142 slidably mounted on said grooved drive shaft 144, said first ball spline nut 136 having an outer diameter keyed to an inner diameter of said hollow shaft 124 for torque transmission.

5. The apparatus of claim 4 further characterized by:
   (a) means for laterally moving said belt supporting transverse housing 76 along said hollow shaft 144, said means for laterally moving said transverse housing 76 comprising a linear actuator 172 and,
   (b) said belt drive sprocket 106 of said transverse housing 76 being rotated by rotation of said drive shaft 144.

* * * * *